April 12, 1949.  R. D. VAN VLECK  2,466,831
ICE CUBE MACHINE

Filed March 21, 1945  2 Sheets-Sheet 1

INVENTOR.
ROBERT D. VAN VLECK,
BY
ATTORNEY.

April 12, 1949.    R. D. VAN VLECK    2,466,831
ICE CUBE MACHINE
Filed March 21, 1945    2 Sheets-Sheet 2
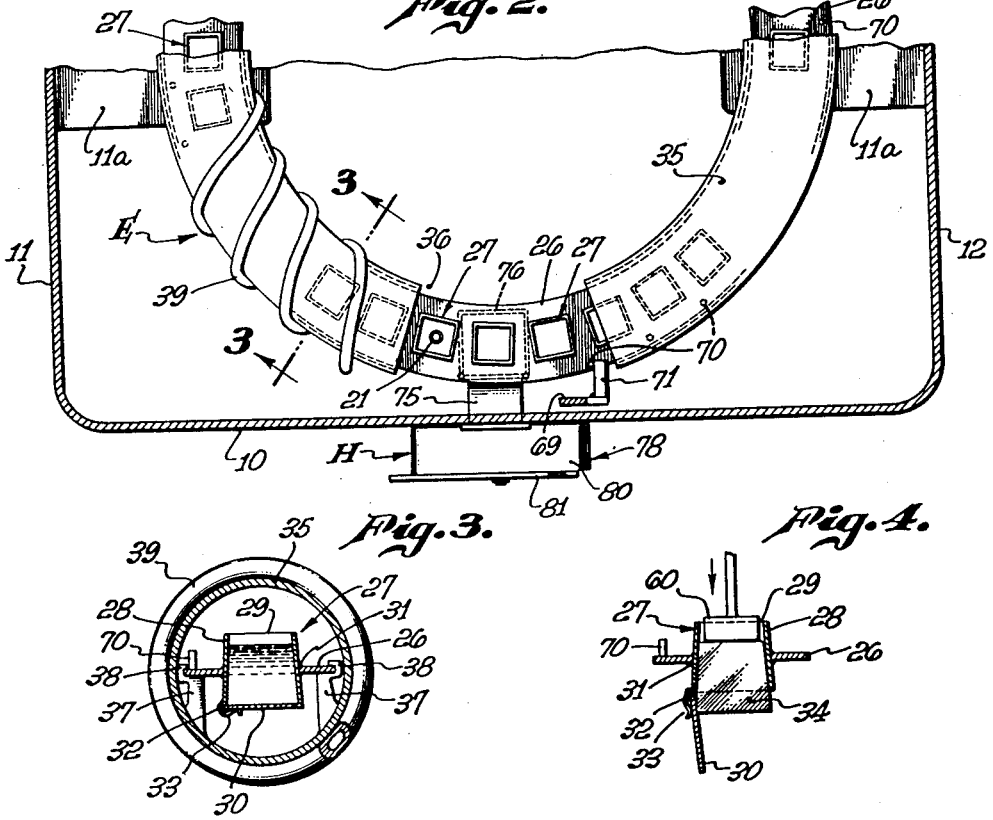
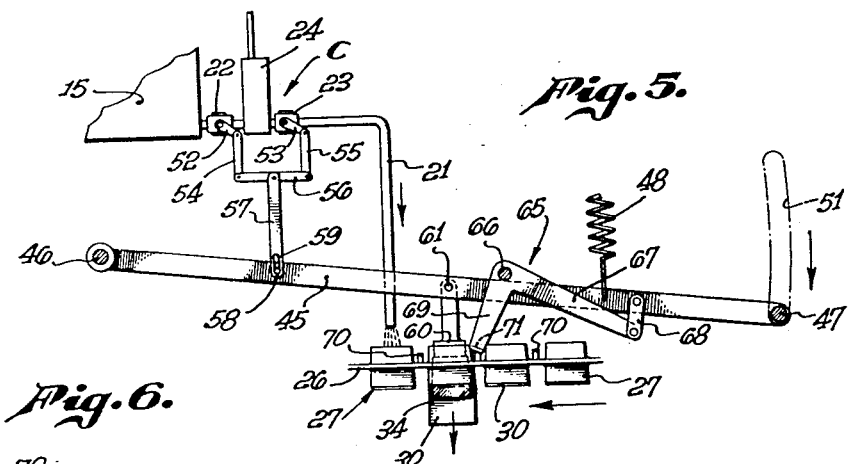
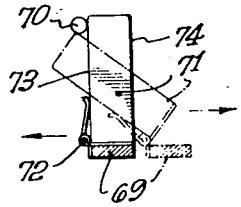
INVENTOR.
ROBERT D. VAN VLECK,
BY
ATTORNEY.

Patented Apr. 12, 1949

2,466,831

UNITED STATES PATENT OFFICE 2,466,831

ICE CUBE MACHINE

Robert D. Van Vleck, Burbank, Calif.

Application March 21, 1945, Serial No. 583,884

10 Claims. (Cl. 62—89)

1

This invention relates to refrigeration and deals more particularly with a machine for providing ice cubes and ice chips or flakes, selectively. An object of the invention is to provide a machine of the character indicated which is simple in both construction and operation and which functions to provide a continuous supply of ice cubes according to the rapidity with which the cube supply is used up.

Another object of the invention is to provide a machine of the character indicated having novel means for measuring or metering the water supply to obtain uniformity in the size of ice cubes produced by said machine.

Another object of the invention is to provide an ice cube making apparatus having a novel design of freezing chamber or compartment resulting in a product uniform as to shape and texture.

A further object of this invention is to provide a refrigeration machine incorporating selective means for obtaining either ice cubes or ice chips or flakes.

A further object of the invention is to provide a refrigeration machine having water metering means and tray means and to provide said machine with novel operating means for effecting discharge from the metering means into the tray means and substantially simultaneous discharge of ice cubes from said tray means.

The various objects and features of my invention will be fully understood from the following detailed description of a typical preferred form and application of the invention, throughout which description reference is made to the accompanying drawings, in which:

Fig. 2 is a partial plan sectional view as taken on the line 2—2 of Fig. 1.

Fig. 3 is a detail sectional view as taken on the line 3—3 of Fig. 2.

Fig. 4 is a similar view of some of the element shown in Fig. 3 and in another operating position.

Fig. 5 is a fragmentary front view of the operating mechanism employed in the machine, said mechanism being shown in operated position.

Fig. 6 is a plan sectional view of an operating detail.

Figure 1:
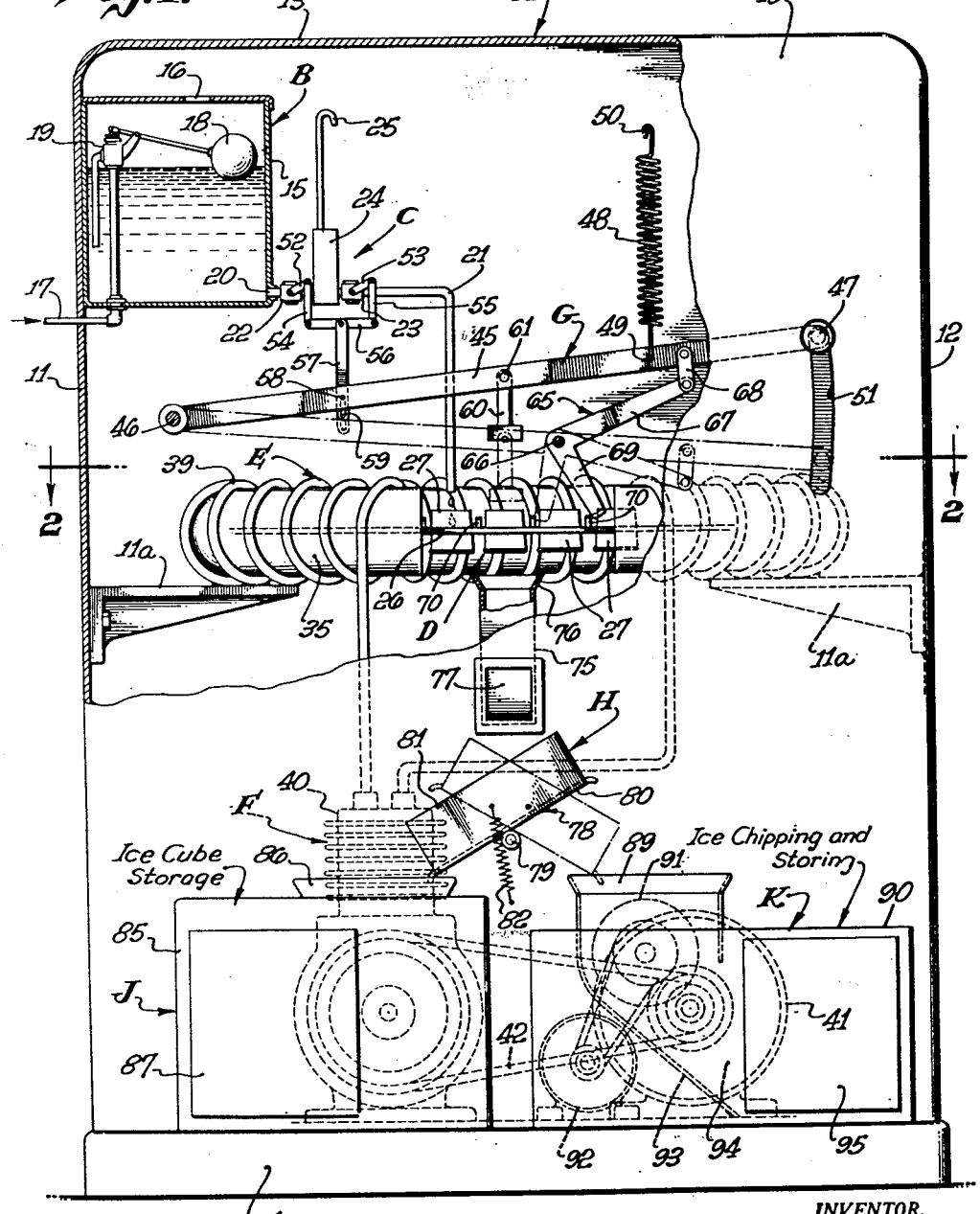
Fig. 1 is a front elevational view of a machine embodying the invention, a portion of the front wall being broken away to expose the interior of the machine.

The machine herein contemplated may have many uses. Primarily, I intend to produce ice cubes and to selectively chip or flake said cubes as the need for ice, in such form, is desired.

2

Inasmuch as I employ trays which function as molds, I may design said trays in various shapes, sizes and forms other than cubes. I may design the trays to mold various shapes such as flowers, animals and the like. I may add coloring or flavoring to the water or I may produce frozen confections such as gelatins, custards and the like. While the following detailed specification deals particularly with a machine for making ice cubes, I do not intend to exclude such modifications of the machine as may be required to produce the items above mentioned or which may fall within the broad concepts of the invention.

The machine, as contemplated, may be said to comprise a housing or cabinet A; means B for receiving and storing water within the interior of the cabinet; means C for receiving water from the storing means and for metering or measuring the same; ice cube tray means D for molding ice and for receiving measured quantities of water from the means C; a refrigerating or freezing chamber or compartment E through which the means D may move progressively; refrigerating apparatus F for producing a low temperature in the chamber E; operating mechanism G for controlling the metering means C, the movement of the tray means D, and the discharge of ice cubes from said tray means; chute means H for directing the ice cubes, selectively, to cube storage means J and ice chipping or flaking means K; and various other elements hereinafter described.

The cabinet A may comprise a box-like housing having a front wall 10, side walls 11 and 12, and a top wall 13. The rear of the cabinet may be open but is preferably provided with a closure wall which may be opened to provide access to the interior of the cabinet. The structure of the cabinet walls is such as is conventional for ice making machines and, accordingly, suitable heat insulation may be provided. The wall structure of the cabinet may be supported on a flat base 14.

The water receiving and storing means B may comprise a water tank 15 which may be carried by a wall of the cabinet as the wall 11. The tank is shown as a box-like container with a top vent 16. Means such as a pipe 17 may be provided for admitting water into the tank 15. A mechanism involving a float 18 is provided to control a valve 19 and may function in the manner of a flush tank mechanism to limit the amount of water flowing to the tank 15 from the pipe 17. A discharge opening 20 is provided at or near the bottom of the tank.

The metering means C is preferably positioned within the cabinet to receive water from the tank means B, receiving the same through the opening 20. Said means C may comprise a flow line comprising a pipe 21 extending from the tank 15 toward the tray means D, and in said line there may be placed a measuring or metering container 24 flanked by a normally open valve 22 and a normally closed valve 23. The container 24 is preferably vented at 25.

From the foregoing it will be seen that water will flow from the tank 15 through the open valve 22 and will fill the container 24. When, as later described, the valve 23 is opened and the valve 22 simultaneously closed, the water in the container 24 will flow through the valve 23 and out through the pipe 21. A measured quantity of water will thus be discharged from said pipe, said quantity being the capacity of the container 24. As water flows from the tank 15, the water level therein will fall and, consequently, the float 18 will drop. When the float 18 has dropped sufficiently to open the valve 19, which it controls, an additional supply of water from the pipe 17 will enter the tank through said open valve to raise the water level therein, causing lifting of the float 18 and consequent closing of the valve 19. In this manner the machine is assured a continuous supply of water.

The water from the metering means C is discharged as desired into the tray means D. Said latter means may comprise a plurality of ice forming molds arranged for progressive movement past the discharge end of the pipe 21 and while said molds may be variously arranged for this purpose, I prefer to arrange them to move in a circular path. Accordingly, the means D may comprise an annular or ring-shaped flat plate 26 preferably horizontally positioned within the cabinet A beneath the metering means C. Plate 26 is designed to function as a carrier and conveyor for a plurality of ice molds or receptacles 27 which are uniformly spaced on a medial center line circle between the inner and outer circumferential edges of the ring plate 26.

Each mold 27 may comprise a rectangular or box-like container having side walls 28, an open top 29, and a displaceable bottom wall 30. The molds are secured in suitable openings in the ring plate 26 as by soldering or brazing 31, and each mold preferably extends partly above and partly below said ring plate. The walls 28 may be parallel or substantially so, but I prefer to pitch or flare them outwardly so that the shape of each mold is frusto-pyramidal with the larger base at the bottom. The bottom wall 30, as shown, may be carried by the bottom edge of a wall 28 of each mold 27 as by a hinge 32 and said bottom wall may be yieldingly held in position to close the bottom of the mold by spring means 33.

It is evident from the above that water discharged from the pipe 21 enters a mold 27 positioned thereunderneath. Accordingly, said molds each have a capacity at least as large as that of the metering container 24 and preferably somewhat larger. When, as later set forth, the water in a mold 27 is frozen, an ice cube 34 of desired size is formed. It may be seen that said ice cube may be ejected from its mold by pushing upon the top thereof through the mold top opening 29. The cube, in turn, will push against the bottom 30 which will swing downwardly on its hinge 32 as best seen in Fig. 4. Because of the flared shape of the mold, the cube will immediately lose contact with the sloping walls 28 of said mold and will freely drop out of the mold. The spring 33 will immediately act to restore the bottom 30 to a closed position and the mold is again ready to receive a measured quantity of water from the metering means C.

I may support the tray means D in various ways. However, I prefer to support said means for horizontal circular movement within the refrigerating or freezing chamber E. Said chamber may comprise a cylindrical ring or torus 35 which is continuous except for a gap 36. The chamber thus encloses the tray means D except for several molds 27 to which access is thus afforded for filling with water from the means C and for operative association with the operating mechanism G and the chute means H. The torus may be carried within the cabinet A as upon brackets 11ᵃ mounted on the cabinet walls 11 and 12. Within the torus I may provide a plurality of support guides 37 upon which the ring plate 26 may rest, said support guides being preferably provided with portions 38 having guiding engagement with the inner and outer circumferential edges of the ring plate.

Refrigeration tubing 39 may be coiled helically around the torus, said tubing containing refrigerant fluid supplied by the refrigerating apparatus F. The cross-sectional size of the torus 35, as best seen in Fig. 3, is preferably such as to provide a freezing chamber of suitable size in relation to the size of the molds 27 in said chamber. I prefer to keep said chamber as small as practicable in order to obtain rapid freezing of the water in the molds with economic operation of the refrigerating apparatus F.

The refrigerating apparatus F may be of conventional design and form and of a capacity comparable with the size and capacity of the machine. Said apparatus may be mounted on the cabinet base 14 and may comprise means 40 which includes a pump, a compresser, etc. An electric motor 41, driving the means 40 through the medium of a belt 42, may also be provided. No matter how made the means F is intended to function to maintain the temperature within the torus, at a level below that for freezing water and, for this purpose, suitable manual and automatic thermostatic means may be employed for controlling the operation of said means F.

The means G is provided for controlling the metering means C, the movement of the tray means D through the refrigeration chamber E, and for ejecting ice cubes from said tray means and into the chute means H. Said means G may include an operating lever 45 or any suitable operating member having either manual or automatic control. In this instance, the lever 45 is a manually controlled member disposed within the cabinet A and adjacent the front wall 10 of said cabinet. It is mounted on a pivot 46 carried by said front wall, is provided with a control knob 47 at its free end, and is normally held in an elevated non-operating position as by a spring 48 connected with the lever at 49 and with said front cabinet wall 10, at 50. The knob projects through the front wall 10 to be accessible for manual operation from the front of the machine. Movement of the lever on its pivot 46 is afforded by an arcuate slot 51 provided in said front cabinet wall and through which the knob 47 projects. The normal non-operated raised position of the lever 45 is limited by the upper end of said slot 51.

The valves 22 and 23 are operated by the lever 45, the means affording such operation comprising valve levers 52 and 53, links 54 and 55 connected to said levers respectively, a cross link 56 connecting said links 54 and 55, and a link 57 connecting the center of said cross link and the operating lever 45 as by a pin 58. As previously described, the valve 22 is normally open and the valve 23 normally closed and this condition, as shown in Fig. 1, prevails when the operating lever 45 is held raised by the spring 48. When the knob 47 is depressed the lever 45 will move on its pivot 46 to exert a pull on the link 57 which, in turn, pulls the cross link 56 and the connecting links 54 and 55 to swing the valve levers 52 and 53. This movement of the levers 52 and 53 closes the valve 22 and opens the valve 23. This operated position is shown in Fig. 5. Upon release of the knob 47, the spring 48 will return the parts to their initial position. It is evident that the linkage may be so timed and coordinated as to provide for closing the valve 22 slightly ahead of opening the valve 23 for obtaining metering accuracy and that the valve 23 may be closed ahead of opening the valve 22 to prevent undue spilling of water from the line 21. In the present design, the link 57 is formed with a slot 59 to provide a lost-motion connection with the pin 58 of the lever 45. By means of this connection the valves 22 and 23 are operated only during the final part of the movement of the lever 45 either up or down.

The lever 45 also carries means for dislodging an ice cube 34 from one of the molds 27. This means may comprise an ejector 60 which, in a simple manner, may be pendently hung on a pivot pin 61 from said lever 45. The lever, on its pivot 46, moves in an arcuate path and the pivot pin 61, therefore, moves in a similar path. However, the ejector, while also moving bodily in the path of the pin 61, maintains a pendent disposition so that it may enter the opening 29 of a mold therebeneath to engage and push against an ice cube 34 therein and to eject the same. In this design the ejector 60 and the mold are positionally related to cause ejection of an ice cube during the final part of the movement of the lever 45.

The lever 45 further carries means for moving the tray means D progressively in a circular path in the refrigerating chamber E, said means, in part, being also carried by the cabinet A as on the wall 10 thereof. The tray moving means may comprise a bellcrank lever 65 mounted on a pivot pin 66 carried by said cabinet wall 10. One arm 67 of the bell crank lever 65 connects to the lever 45 by means of a link 68. The other arm 69 of said bellcrank lever is arranged in overstanding relation to the ring plate 26 and in position to engage one of a plurality of uniformly spaced upright pins 70 carried on the top of said plate. For this purpose, the lever arm 69 may be provided with a horizontally disposed foot part 71 which is pivotally mounted on said arm as at 72 whereby the foot part 71 may move with the arm as a rigid portion of said arm when the lever 45 is depressed to move the bellcrank lever 65 on its pivot in a clockwise direction. During this movement of the levers 45 and 65, the edge 73 of the foot 71 will engage one of the pins 70 to move it and, consequently, the ring plate 26. The latter will move in a circular path until the foot 71, since it moves in a rising arc, loses contact with the pin 70 with which it is engaged. The ring plate 56 will come to rest, but the lever 45 can be further depressed. It is during the latter downward movement of the lever 45 that the pin and slot connection at 58 and 59 becomes effective to operate the metering means C to discharge water into an empty mold 27, and the ejector 60 effects contact with the ice cube 34 in a mold to eject the same as previously described. Upon release of the knob 47, the spring 48 will become effective to move the bellcrank lever 65 on its pivot 66 in the other direction. During this latter movement of the bellcrank lever the edge 74 of its foot 71 will re-engage the pin 70 which it had previously moved. Since the pivot 72 is placed to permit tilting of the foot 71 during counterclockwise movement of the bellcrank, said foot will tilt on its pivot and slip by said pin 70 without affecting the position of the ring plate 26. Upon complete restoration of the operating lever 45 to its raised position, the foot 71 will resume its position to engage the next succeeding pin 70 to move it and the ring plate upon consequent depression of said operating lever.

From the foregoing it will be seen that upon each downward movement of the knob 47, the ring plate 26 will be moved first and then the previously emptied mold 27 will be filled with water and the next succeeding mold, simultaneously emptied of its ice cube. Variation in the mode of operation of the mechanism G may be made. For instance, the first part of the downward movement of the operating lever 45 may effect the movement of the tray means D and the final part of said movement may operate the water metering and ice ejecting elements. Also, the mechanism may be varied to cause movement of the tray means D upon downward movement of the operating lever, and operation of the water metering and ice ejecting elements upon upward return movement of said lever. No matter how designed I intend to provide for the ejection of an ice cube from one of the molds 27 and simultaneous filling with water of a previously emptied mold for each operational movement of the operating mechanism of the machine.

An ice cube 34 ejected from a mold 27, falls into the tray means H. Said means may comprise a chute 75 having an ice cube receiving portion 76 disposed below and in position to receive an ice cube from the molds 27 successively. The chute 75 is formed to direct an ice cube falling therein, to a front opening 77 in said chute from which it may fall upon a cube directing chute 78 adapted to direct a cube laterally, in either direction, selectively. The chute 78 is preferably positioned at the outside front of the machine and may be carried on the front wall 10 as upon a pivot pin 79. The chute 78 illustrated is formed with a bottom wall 80 and with an upright wall 81, so as to provide a trough defined by said bottom walls, said upright wall, and the cabinet wall 10. The chute 78 is mounted centrally on the pivot pin 79 so that it may be tilted in either direction whereby an ice cube falling thereon may be directed, as desired, to the right or to the left. Means such as an over center spring 82 may be employed for maintaining selected tilted position of the chute 78.

When it is desired to retain the ice cubes in the form in which they are molded, the chute 78 may be tilted to the left so as to direct cubes to the ice cube storage means J. The latter may comprise a refrigerated suitably shaped housing 85 having a top cube receiving opening 86 and an access door, or the like, 87 at its front. The housing 85 may be supported on the machine base 14 and may be positioned either in front of the cabinet wall 10 as shown, or within the cabinet A, if desired. Ice cubes may be removed from the storage means J, as needed.

Should ice chips or flakes be desired, the chute 78 is tilted to direct ice cubes falling thereon into the ice chipping or storing means K. The latter is carried and positioned in a manner similar to that of the means J and may comprise an enclosed unit 90 having a receiving opening 89 in which may be housed ice chipping mechanism such as shown at 91. The latter is shown operated by a motor 92. The ice chips or flakes may be directed, by means of a chute 93, to a storage compartment 94 in the unit 90, and access to said compartment may be had through a door 95.

From the foregoing it may be seen that a simple, compact and efficient machine has been provided in accordance with the objects of the invention. The machine offers a flexibility of uses in the embodiment described since either ice cubes or ice chips may be obtained as desired. However, an embodiment may be constructed in which the storage means J and the chipping means K may be omitted. In such an embodiment the chute portion 78 may also be omitted and the chute 76 designed to discharge an ice cube directly into any container or vessel.

An embodiment of the machine may also be constructed in which the refrigeration apparatus F may be omitted from the cabinet A and placed at a remote point, or the machine may be connected together with similar or other refrigerating units, to a single large capacity refrigeration plant.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A machine of the character described including water storing means, means for successively metering like quantities of water from said storing means, a plurality of downwardly flared mold receptacles with hinged bottoms and operated to successively receive said metered quantities of water, means for freezing the water in the mold receptacles to form ice cubes, and means for successively ejecting said ice cubes downwardly out of said mold receptacles including a vertically reciprocating ejector with which the receptacles are successively aligned.

2. A machine of the character described including water storing means, means for successively metering like quantities of water from said storing means, a revolving unit including a plurality of downwardly flared mold receptacles with hinged bottoms and adapted to successively receive said metered quantities of water, means for freezing the water in the mold receptacles to form ice cubes, means for successively ejecting said ice cubes downwardly out of said mold receptacles, and chute means beneath said unit for receiving said ice cubes and directing them so they flow out of the machine by gravity.

3. A machine of the character described including water storing means, means for successively metering like quantities of water from said storing means including a water flow line connected with the water storing means and a measuring receptacle, a pivotally mounted unit including a plurality of downwardly flared mold receptacles for successively receiving said metered quantities of water, means for freezing the water in the mold receptacles to form ice cubes, means for ejecting said ice cubes from said mold receptacles, and a single operating means manually operable to simultaneously actuate said last mentioned means and the first mentioned means.

4. A machine of the character described including water storing means, a water supply line for said storing means, float means controlling the flow from said line to the water storing means, means for successively metering like quantities of water from said storing means including a water flow line connected with the water storing means, a measuring receptacle, and valves controlling flow from the flow line to the receptacle and from the receptacle, an annular unit including a plurality of mold receptacles successively positioned by operation of said unit to receive said metered quantities of water, means for freezing the water in the mold receptacles to form ice cubes including a jacket around the unit and extending lengthwise thereof, means for ejecting said ice cubes from said mold receptacles, and manually operated means operating the valves and said unit in synchronism.

5. A machine of the character described including water storing means, a water supply line for said storing means, means controlling the flow of water from said line to the water storing means, means for metering like quantities of water from said storing means including a water flow line connnected with the water storing means, a measuring receptacle, and control valves controlling flow to and from the measuring receptacle, a unit mounted for rotation about a vertical axis and including a plurality of mold downwardly flared receptacles for receiving said metered quantities of water, means for freezing the water in the mold receptacles to form ice cubes, and means for ejecting said ice cubes downwardly and out of said mold receptacles.

6. A machine of the character described including water storing means, means for metering like quantities of water from said storing means, an annular unit with a fixed vertical axis and including a plurality of mold receptacles for receiving said metered quantities of water, means for freezing the water in the mold receptacles to form ice cubes including an annular jacket surrounding and supporting said unit and a refrigerant carrying coil surrounding the jacket, and means for ejecting said ice cubes from said mold receptacles.

7. A machine of the character described including water supply means, means for measuring quantities of water flowing from said supply means, means for receiving said measured quantities of water and including a plurality of mold receptacles, means housing said receptacles for freezing the water therein to form ice cubes, means for ejecting said ice cubes from said mold receptacles, common operating means for progressively moving said mold receptacles and for simultaneously operating the water measuring means and the ice cube ejecting means, ice cube storing means, ice chipping means, and chute means receiving ice cubes ejected from said mold receptacles and operable to direct the cubes to the storing means or said ice chipping means.

8. A machine of the character described including water supply means, means for measuring quantities of water flowing from said supply means, means for receiving said measured quantities of water and including a plurality of mold receptacles, means housing said receptacles for freezing the water therein to form ice cubes, means for ejecting said ice cubes from said mold receptacles, common operating means for progressively moving said mold receptacles and for simultaneously operating the water measuring means and the ice cube ejecting means, ice cube storing means, ice chipping means, and chute means operable to direct ice cubes ejected from said mold receptacles either to said ice cube storing means or to said ice chipping means, said chute means comprising a stationary chute receiving ice cubes and a tiltable chute delivering ice cubes.

9. A machine of the character described including, means operable to form ice cubes, cube storing means, ice chipping means, and chute means for directing ice cubes from the first mentioned means to said ice cube storing means and said ice chipping means selectively, said chute means including a stationary chute for receiving ice cubes, a tiltable delivery chute for receiving said cubes from the stationary chute and having two operating positions one in which it delivers cubes to the storing means and the other in which it delivers cubes to the chipping means, and means for maintaining the tiltable chute in either of said positions.

10. In an ice cube making machine, a plurality of ice molding receptacles, an annular carrier for said receptacles, means for moving said carrier about its central axis, means supporting the carrier including a ring-shaped refrigerating chamber surrounding said carrier and receptacles, and a refrigerant coil wrapped around the chamber shaped plate and said chamber comprising a cylindrically circular housing.

ROBERT D. VAN VLECK.

REFERENCES CITED

The following references are of record in the file of this patent:

UNITED STATES PATENTS

| Number | Name | Date |
|---|---|---|
| 63,404 | Lowe | Apr. 2, 1867 |
| 236,471 | Windhausen | Jan. 11, 1881 |
| 1,658,038 | Budde | Feb. 7, 1928 |
| 1,824,309 | Storer | Sept. 22, 1931 |
| 1,857,122 | Sherman | May 3, 1932 |
| 2,026,227 | Foracker | Dec. 31, 1935 |
| 2,058,077 | Greenwald | Oct. 20, 1936 |
| 2,259,066 | Gaston | Oct. 14, 1941 |
| 2,364,559 | Storer | Dec. 5, 1944 |
| 2,431,916 | Caesar | Dec. 2, 1947 |
| 2,435,285 | Lucia | Feb. 3, 1948 |